United States Patent
Thomasson et al.

(10) Patent No.: US 10,630,127 B1
(45) Date of Patent: Apr. 21, 2020

(54) ELECTRIC MOTOR WITH BAR WOUND STATOR AND END TURN COOLING

(71) Applicants: Dillon J. Thomasson, Cupertino, CA (US); Kan Zhou, Sunnyvale, CA (US); Rui Guan, Sunnyvale, CA (US); Yateendra B. Deshpande, San Jose, CA (US); William M. Price, San Francisco, CA (US)

(72) Inventors: Dillon J. Thomasson, Cupertino, CA (US); Kan Zhou, Sunnyvale, CA (US); Rui Guan, Sunnyvale, CA (US); Yateendra B. Deshpande, San Jose, CA (US); William M. Price, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 120 days.

(21) Appl. No.: 15/862,829

(22) Filed: Jan. 5, 2018

Related U.S. Application Data

(60) Provisional application No. 62/443,219, filed on Jan. 6, 2017.

(51) Int. Cl.
| | |
|---|---|
| H02K 3/24 | (2006.01) |
| H02K 3/38 | (2006.01) |
| H02K 3/50 | (2006.01) |
| H02K 9/19 | (2006.01) |
| H02K 3/12 | (2006.01) |

(52) U.S. Cl.
CPC .................. *H02K 3/24* (2013.01); *H02K 3/12* (2013.01); *H02K 3/38* (2013.01); *H02K 3/505* (2013.01); *H02K 9/19* (2013.01)

(58) Field of Classification Search
CPC .. H02K 9/19; H02K 3/24; H02K 3/04; H02K 3/12; H02K 3/46; H02K 3/50; H02K 3/52; H02K 3/521
USPC ................ 310/52, 54, 58, 59, 179, 180, 208
See application file for complete search history.

(56) References Cited

U.S. PATENT DOCUMENTS

| | | |
|---|---|---|
| 3,109,947 A | 11/1963 | Thompson et al. |
| 3,984,712 A | 10/1976 | Hill |
| 5,081,382 A | 1/1992 | Collings et al. |
| 5,828,147 A | 10/1998 | Best et al. |
| 6,515,383 B1 | 2/2003 | Ognibene et al. |
| 6,744,158 B2 | 6/2004 | Liang et al. |
| 6,924,570 B2 | 8/2005 | De Filippis et al. |
| 7,538,457 B2 | 5/2009 | Holmes et al. |
| 8,093,770 B1 * | 1/2012 | Berhan ............. H02K 9/19 310/52 |
| 8,198,762 B2 | 6/2012 | Gagnon |
| 9,118,224 B2 | 8/2015 | Okimitsu |
| 2010/0253165 A1 | 10/2010 | Kaiser et al. |
| 2010/0264760 A1 * | 10/2010 | Matsui ............. H02K 3/24 310/54 |

(Continued)

FOREIGN PATENT DOCUMENTS

| | | |
|---|---|---|
| EP | 1168571 A2 | 1/2002 |
| GB | 2468018 A | 8/2010 |
| WO | 2016044570 A1 | 3/2016 |

*Primary Examiner* — Thomas Truong
(74) *Attorney, Agent, or Firm* — Young Basile Hanlon & MacFarlane, P.C.

(57) ABSTRACT

An electric motor includes an end turn ring and a cooling structure that is in a thermally conductive relationship with the end turn ring.

24 Claims, 11 Drawing Sheets

(56) References Cited

U.S. PATENT DOCUMENTS

| | | | |
|---|---|---|---|
| 2013/0200743 A1* | 8/2013 | Okimitsu | H02K 3/12 |
| | | | 310/201 |
| 2013/0320800 A1* | 12/2013 | Senoo | H02K 3/522 |
| | | | 310/214 |
| 2014/0125188 A1 | 5/2014 | Marvin et al. | |
| 2015/0162793 A1 | 6/2015 | Hashimoto et al. | |
| 2015/0222162 A1 | 8/2015 | Pinkley et al. | |
| 2016/0308406 A1* | 10/2016 | Kitora | H02K 3/522 |
| 2016/0344269 A1* | 11/2016 | Yabe | H02K 3/50 |
| 2017/0271957 A1* | 9/2017 | Hanumalagutti | H02K 9/19 |

* cited by examiner

ELECTRIC MOTOR WITH BAR WOUND
STATOR AND END TURN COOLING

CROSS-REFERENCE TO RELATED
APPLICATIONS

This application claims the benefit of U.S. Provisional Application No. 62/443,219, filed on Jan. 6, 2017, entitled "Electric Motor with Bar Wound Stator and End Turn Cooling," the content of which is incorporated herein by reference in its entirety for all purposes.

TECHNICAL FIELD

The application relates generally to electric motors.

BACKGROUND

Electric motor designs typically include a stator and a rotor. The stator is an annular structure that is fixed in a housing. The rotor is positioned within the stator along an axis and is supported with respect to the housing such that it is able to rotate relative to the stator. In some electric motor designs, permanent magnets are connected to the rotor, and windings are connected to the stator. The windings are energized to induce rotation of the rotor with respect to the stator in response to interaction of the magnetic fields created by energization of the phase windings with the permanent magnets.

The stator windings may be of the wire-wound type or of the bar-wound type. Wire-wound windings include bundles of conductors that are wrapped around stator teeth of the stator and disposed within the slots of the stator. Bar-wound windings include rigid bars, typically formed from copper, that are disposed within the slots of the stator. Both types of windings include end turns, which are portions of the windings located at the ends of the stator to interconnect portions of the windings that are located in different slots.

SUMMARY

One aspect of the disclosed embodiments is an electric motor that includes a stator body that defines slots. Winding bars are each disposed in one of the slots defined by the stator body. An end turn ring has an upper ring surface and a lower ring surface, and includes bus bars that are arranged in a circular array. Each bus bar of the bus bars has a first end portion that is connected to one of the winding bars and a second end portion that is connected to one of the winding bars. The first end portion has a lower bar surface that defines part of the lower ring surface. The second end portion has an upper bar surface that defines part of the upper ring surface. A cooling structure is disposed in a thermally conductive relationship with at least one of the upper ring surface or the lower ring surface for receiving heat from the end turn ring.

Another aspect of the disclosed embodiments is an electric motor that includes a stator body that defines slots. The electric motor also includes winding bars that are each disposed in one of the slots defined by the stator body. An end turn assembly has an upper surface and a lower surface, and is connected to the winding bars. A cooling structure has a first portion that is in a thermally conductive relationship with the lower surface of the end turn assembly and a second portion that is in a thermally conductive relationship with the upper surface of the end turn assembly.

Another aspect of the disclosed embodiments is an electric motor that includes a stator body that defines slots. The electric motor also includes winding bars that are each disposed in one of the slots defined by the stator body. Each of the winding bars defines an internal passageway. An end turn ring has an upper ring surface and a lower ring surface, and includes bus bars that are arranged in a circular array. Each of the bus bars has a first end portion that is connected to one of the winding bars, and a second end portion that is connected to one of the winding bars. The first end portion has a first upward-facing surface. The second end portion has a second upward-facing surface. An annular cooling manifold supplies a liquid to the internal passageway of each of the winding bars through liquid ports. The liquid ports are each sealed to one of the first upward facing surfaces of the bus bars or one of the second upward facing surfaces of the bus bars.

Another aspect of the disclosed embodiments is a three-phase electric motor that includes a stator body that defines slots, an upper end turn assembly and a lower end turn assembly each having bus bars that are arranged in a circular array, and winding bars. The winding bars are each disposed in one of the slots defined by the stator body. The winding bars are straight and each extend from one of the bus bars of the upper end turn assembly to one of the bus bars of the lower end turn assembly.

DETAILED DESCRIPTION

The disclosure herein is directed to bar wound electric motors that include end turn assemblies that allow for cooling to reduce the temperature of the end turns and phase windings of the electric motors.

Figure 1:
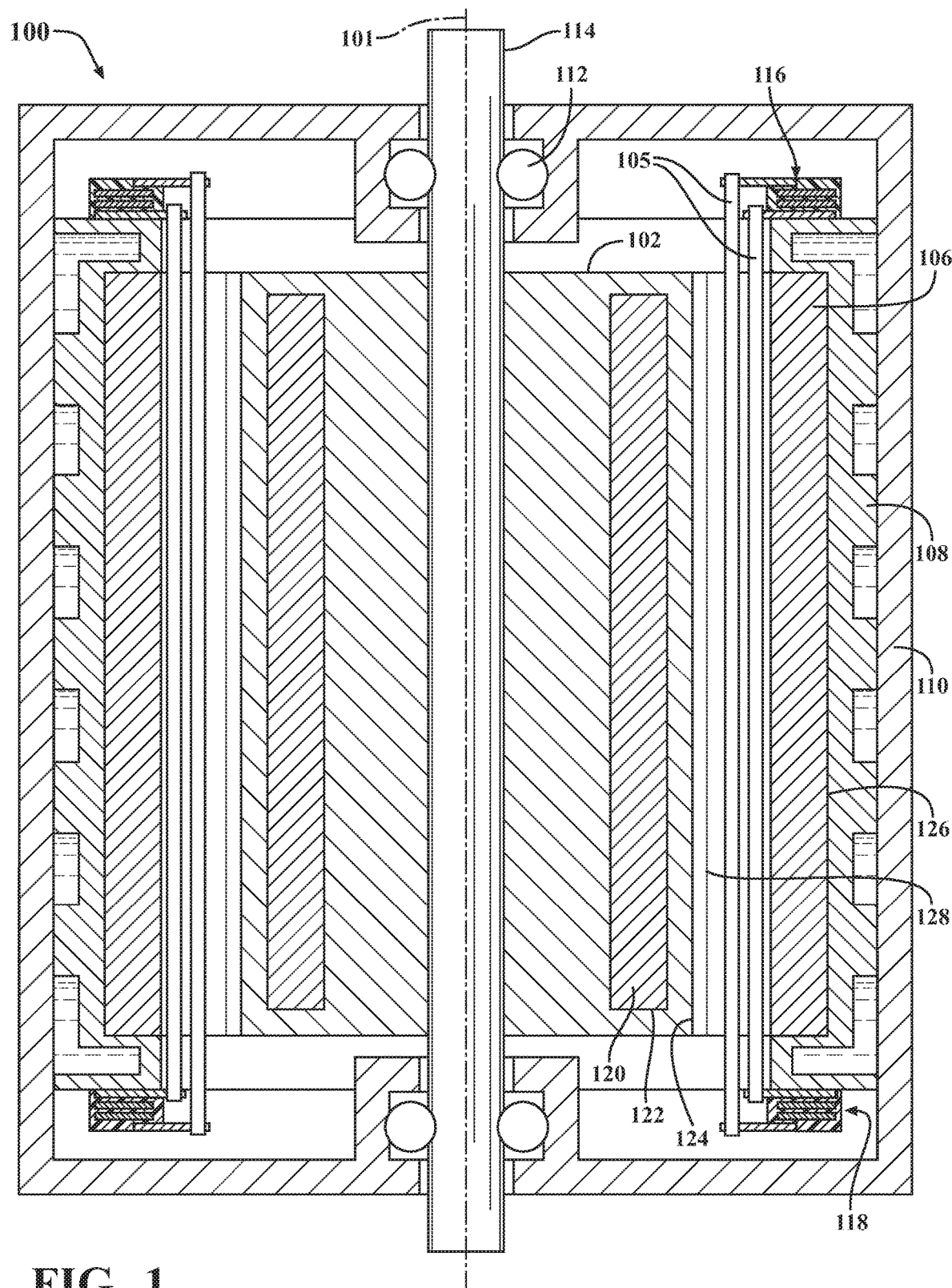
FIG. 1 is a side cross-section view of an electric motor.

FIG. 1 is a side cross-section view of an electric motor 100. The electric motor 100 extends along a central axis 101 and has a rotor 102, winding bars 105, a motor housing 108, a frame 110, bearings 112, a shaft 114, an upper end turn ring 116, and a lower end turn ring 118.

The rotor 102 is connected to the shaft 114. The shaft 114 is in turn supported with respect to the frame 110 by the bearings 112 to allow free rotation of the rotor 102 with respect to the frame 110. In the example shown in FIG. 1, the rotor 102 is an interior permanent magnet type rotor that includes permanent magnets 120 that are disposed in internal slots 122 that are formed in the rotor 102, radially inward from an outer periphery 124 of the rotor 102.

The electric motor 100 is a bar-wound type motor, and the winding bars 105 serve as the phase windings of the electric motor 100. The winding bars 105 are energized and de-energized to induce torque on the rotor 102 in a conventional manner by interaction of magnetic fields generated by the winding bars 105 with the permanent magnets 120 of the rotor 102. The winding bars 105 are connected to the upper end turn ring 116 and the lower end turn ring 118, which interconnect the winding bars 105 and supply electrical power to the winding bars 105.

The stator 106 is a generally cylindrical structure that is centered on the central axis 101 such that the rotor 102 and the stator 106 are coaxial. The stator 106 may be a laminated structure that is formed from plates that are stacked axially and joined together. The stator 106 includes an outer periphery 126, an inner periphery 128, and slots 130. In the illustrated example, the slots 130 are open-ended and extend radially outward from the inner periphery 128 of the stator 106.

Figure 2:
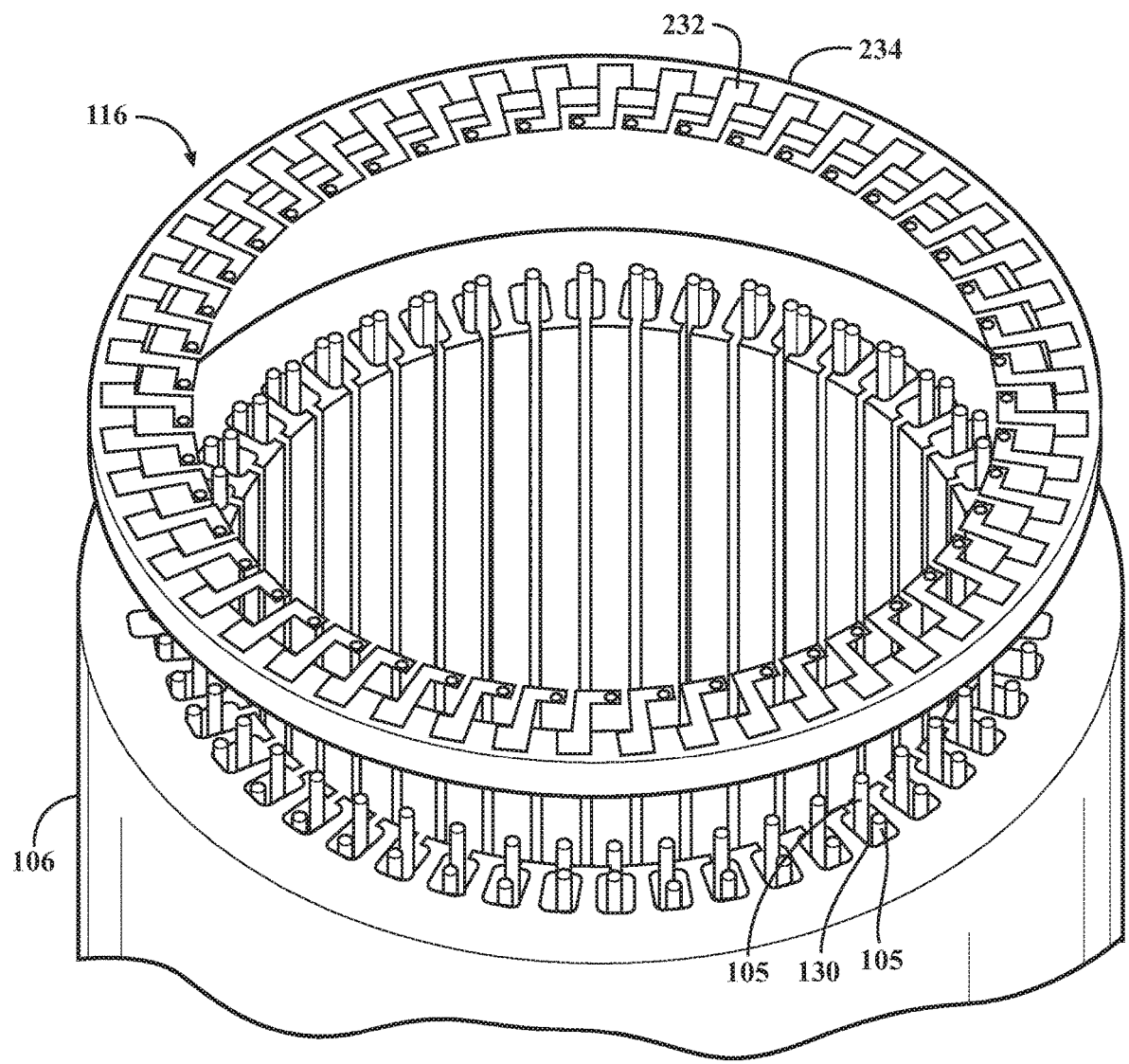
FIG. 2 is an exploded view showing an upper end turn assembly, phase windings, and a stator of the electric motor of FIG. 1.

FIG. 2 is an exploded view showing the upper end turn ring 116, the winding bars 105, and the stator 106. The upper end turn ring 116 and the lower end turn ring 118 are formed in the same manner, and the description of the upper end turn ring 116 is equally applicable to the lower end turn ring 118. In some implementations, however, the electric motor 100 may include only the upper end turn ring 116, with end turns at the opposite end of the electric motor 100 being formed by bending the winding bars 105.

The upper end turn ring 116, which may also be referred to as an end turn assembly, is an annular structure. The upper end turn ring 116 extends around the central axis 101 of the electric motor 100 (FIG. 1) such that the upper end turn ring 116 is centered on the central axis 101 and is concentric with respect to the stator 106, the rotor 102, and the shaft 114 of the electric motor 100. The upper end turn ring 116, in cooperation with the lower end turn ring 118, functions to receive electrical power from an external power source (not shown) and distribute the received electrical power to the winding bars 105 during energization and de-energization of the winding bars 105 during operation of the electric motor 100.

The upper end turn ring 116 includes bus bars 232 that are arranged in a circular array. The bus bars 232 function to conduct electrical power such that they interconnect pairs of the winding bars 105. Accordingly, the bus bars 232 are formed from an electrically conductive material, such as copper or another electrically conductive metal. At least a portion of each of the bus bars 232 is exposed at the exterior of the upper end turn ring 116.

To connect the bus bars 232 with respect to one another and thereby define the upper end turn ring 116, the upper end turn ring 116 may include a non-conductive body 234 that connects the bus bars 232 to each other. As an example, the bus bars 232 may be stacked in a circular array and embedded in the non-conductive body 234. The non-conductive body 234 may be a solid body formed from a non-conductive material. As an example, the non-conductive body 234 may be molded onto the bus bars 232. Non-conductive plastic materials may be utilized to form the non-conductive body 234 by molding. Other materials that are able to electrically insulate the bus bars 232 from one another and/or physically connect the bus bars 232 to one another may be utilized for the non-conductive body 234.

Figure 3:
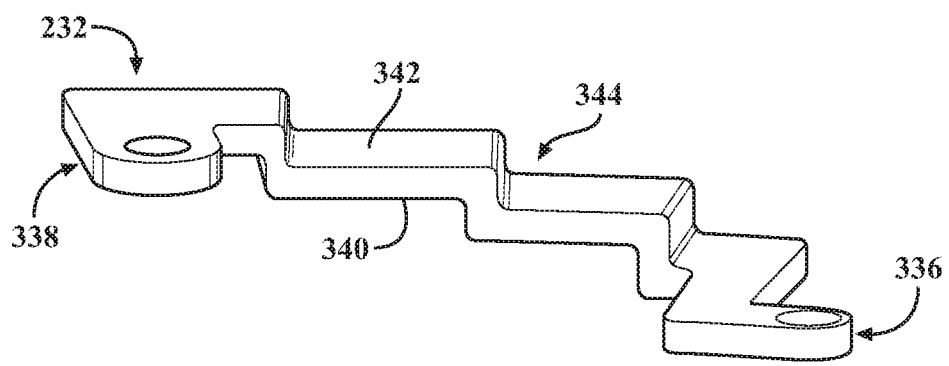
FIG. 3 is a perspective view showing a bus bar.

FIG. 3 is a perspective view showing one of the bus bars 232. The bus bar 232 includes a first end portion 336 and a second end portion 338. The first end portion 336 and the second end portion 338 of the bus bar 232 are located at opposite longitudinal ends of the bus bar 232, with the first end portion 336 being positioned at a first longitudinal end of the bus bar 232 and the second end portion 338 being positioned a second longitudinal end of the bus bar 232.

The bus bar 232 may be a thin structure as measured in a top-to-bottom direction that corresponds to the direction of the central axis 101 of the electric motor 100. For example, the bus bar 232 may be formed from metal that is bent, cast, stamped, or otherwise formed in a desired geometrical configuration for the bus bar 232. As a result of the thin structure of the bus bar 232, the bus bar 232 includes a first surface 340 and a second surface 342 that are opposed to one another in the top-to-bottom direction of the bus bar 232. Each of the first surface 340 and the second surface 342 extend from the first end portion 336 to the second end portion 338 of the bus bar 232. The first surface 340 and the second surface 342 may each include multiple portions separated by geometric features of the bus bar 232, such as steps defined by the bus bar 232 in the example illustrated in FIG. 3.

The bus bar 232 includes an intermediate portion 344. The intermediate portion 344 extends from the first end portion 336 to the second end portion 338. The intermediate portion 344 functions to electrically connect the first end portion 336 and the second end portion 338. The intermediate portion 344 also serves to allow an elevation difference to be defined between the first end portion 336 and the second end portion 338 when the bus bar 232 is incorporated in one of the upper end turn ring 116 or the lower end turn ring 118. As will be described further herein, this allows the first end portion 336 and the second end portion 338 to each be disposed at upper or lower surfaces of the upper end turn ring 116 or the lower end turn ring 118. In the illustrated example of FIG. 3, the intermediate portion 344 provides an elevation difference between the first end portion 336 and the second end portion 338 by incorporating the previously described stepped configuration between the first end portion 336 and the second end portion 338.

Figure 4:
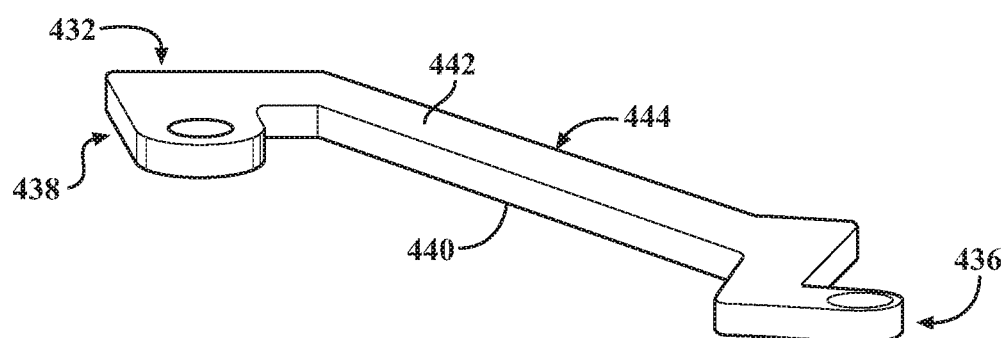
FIG. 4 is a perspective view showing a bus bar according to an alternative implementation.

FIG. 4 is a perspective view showing a bus bar 432 according to an alternative implementation. The bus bar 432 may be incorporated in the upper end turn ring 116 or the lower end turn ring 118 as previously described. As an example, the bus bars 432 may be disposed in a circular array and joined with the non-conductive body 234, such as by molding, to define the upper end turn ring 116 or the lower end turn ring 118.

The bus bar 432 is similar to the bus bar 232 except as otherwise described herein. The bus bar 432 includes a first end portion 436, a second end portion 438, a first surface 440, a second surface 442, and an intermediate portion 444. The bus bar 432 differs from the bus bar 432 in that the intermediate portion 444 lacks the stepped configuration described with respect to the intermediate portion 344 of the bus bar 232. In order to provide an elevation difference between the first end portion 436 and the second end portion 438 when the bus bar 432 is incorporated in one of the upper end turn ring 116 or the lower end turn ring 118, the intermediate portion 444 is angled with respect to the first end portion 436 and the second end portion 438 in order to define a ramp configuration. Thus, the intermediate portion 444 of the bus bar 432 extends upward relative to a plane defined by the first surface 440 in the area of the first end portion 436 of the bus bar 432, until reaching a plane defined by the second surface 442 in the area of the second end portion 438, at which point the intermediate portion 444 terminates and no longer extends upwardly.

Figure 5:
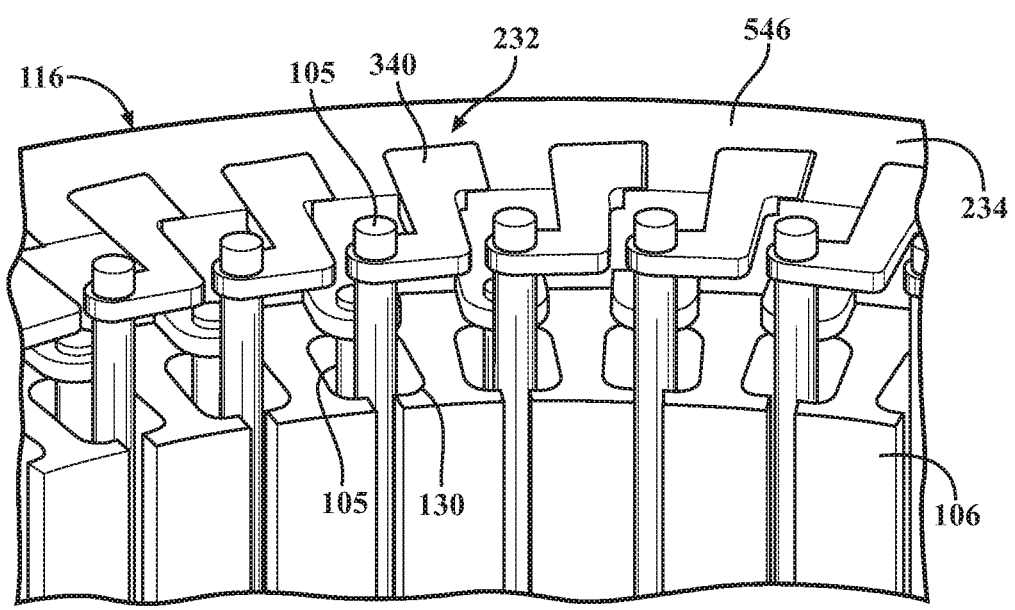
FIG. 5 is a detail view showing the upper end turn assembly connected to the phase windings of the electric motor of FIG. 1.

FIG. 5 is a detail view showing the upper end turn ring 116 connected to the winding bars 105 of the electric motor 100. The bus bars 232 are positioned with respect to the non-conductive body 234 of the upper end turn ring 116 such that the first end portion 336 and the second end portion 338 of each of the bus bars 232 extends radially inward from the non-conductive body 234. This configuration positions the first end portion 336 and the second end portion 338 of each of the bus bars 232 directly above one of the slots 130 of the stator 106. In the illustrated example of FIG. 5, two of the winding bars 105 are disposed within each of the slots 130 of the stator 106. For each of the slots 130 of the stator 106, one of the winding bars 105 is connected to the first end portion 336 of a respective one of the bus bars 232 and the other one of the winding bars 105 is connected to the second end portion 338 of a different one of the bus bars 232. Accordingly, each of the bus bars 232 is connected to a pair of the winding bars 105, with the paired winding bars 105 being disposed within different ones of the slots 130 of the stator 106.

The bus bars 232 may be disposed in the non-conductive body 234 such that the first surface 340 and the second surface 342 of the bus bars 232 form portions of the exterior of the upper end turn ring 116 or the lower end turn ring 118. This allows heat to be dissipated from the upper end turn ring 116 and the lower end turn ring 118, since both of the first surface 340 and the second surface 342 of each bus bar 232 is exposed to the exterior of the upper end turn ring 116 or the lower end turn ring 118. Thus, the upper end turn ring 116 and the lower end turn ring 118 may be formed such that none of the bus bars 232 lacks exposure on the external surfaces of the non-conductive body 234. In addition, the first surface 340 of each of the bus bars 232 may form a portion of an upper ring surface 546 of the upper end turn ring 116 or the lower end turn ring 118, and the portion of the second surface 342 of each of the bus bars 232 may form part of a lower ring surface 547 (shown in FIG. 6) of the upper end turn ring 116 or the lower end turn ring 118. As will be explained further herein, forming the upper end turn ring 116 and the lower end turn ring 118 such that the first surface 340 and the second surface 342 of each of the bus bars 232 is exposed at the exterior of the non-conductive body 234, heat may be efficiently absorbed from the bus bars 232 of the upper end turn ring 116 and the lower end turn ring 118.

Figure 6:
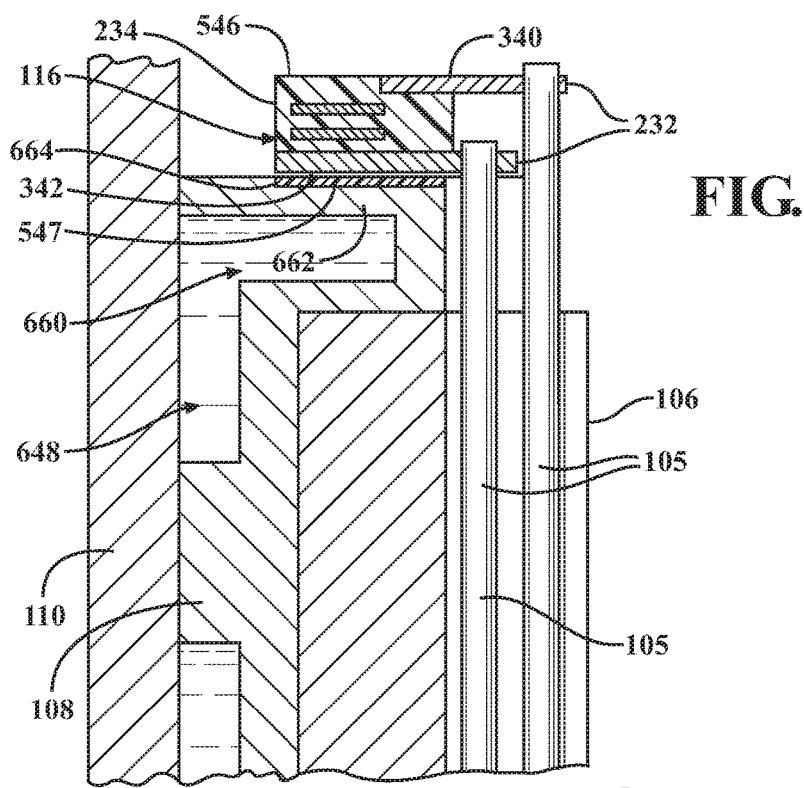
FIG. 6 is a side cross-section view showing the upper end turn assembly and a cooling structure of the electric motor of FIG. 1.

FIG. 6 is a side cross-section view showing the upper end turn ring 116 and a cooling structure of the electric motor 100. The cooling structure is defined by the motor housing 108 and the frame 110 of the electric motor 100. In particular, the relative geometric configurations of the motor housing 108 and the frame 110 define channels that extend annularly around the exterior of the motor housing 108, between the motor housing 108, and the frame 110. A liquid 648 is introduced in the space between the motor housing 108 and the frame 110 to absorb heat from the motor housing 108, which, in turn, absorbs heat from other portions of the electric motor 100. The liquid 648 that is circulated around the motor housing 108 may be chilled before being introduced into the electric motor 100 and may then be removed from the electric motor 100 subsequent to absorbing heat from it in order to be chilled again.

The cooling structure defined in part by the motor housing 108 includes a liquid channel 660 that has a portion of the liquid 648 disposed within it. The liquid channel 660 may be circular and may be centered radially on the central axis 101 of the electric motor 100. The liquid channel 660 is positioned adjacent to a wall 662 that is part of the motor housing 108 and is in contact with the liquid 648 that is disposed within the liquid channel 660. This allows heat from the wall 662 to be transferred into the liquid 648. The wall 662 is positioned between the liquid channel 660 and the upper end turn ring 116. Since the upper end turn ring 116 is also centered radially on the central axis 101 of the electric motor 100, the wall 662 and the liquid channel 660 are positioned adjacent to the upper end turn ring 116 continually around the periphery of the electric motor 100. This allows thermal conduction from the lower ring surface 547 of the upper end turn ring 116 to the cooling structure, including the wall 662 and the liquid channel 660.

The thermally conductive relationship between the lower ring surface 547 and the cooling structure may be accomplished through direct contact of the lower ring surface 547 with the wall 662 or by indirect contact in the form of thermal conduction through an intervening material. In some implementations, the wall 662 incorporates an insulating material 664 on its exterior surface. The insulating material 664 defines an electrical insulation layer that functions to electrically insulate the upper end turn ring 116 from the motor housing 108. In some implementations, the insulating material 664 is formed separately from the wall 662 of the motor housing 108. The insulating material 664 is a material selected so that it can electrically insulate the motor housing 108 from the upper end turn ring 116, while allowing thermal conduction from the upper end turn ring 116 to the wall 662 of the motor housing 108. Thus, the material selected for the insulating material 664 may be a good thermal conductor and is not intended to have thermal insulating properties.

Figure 7:
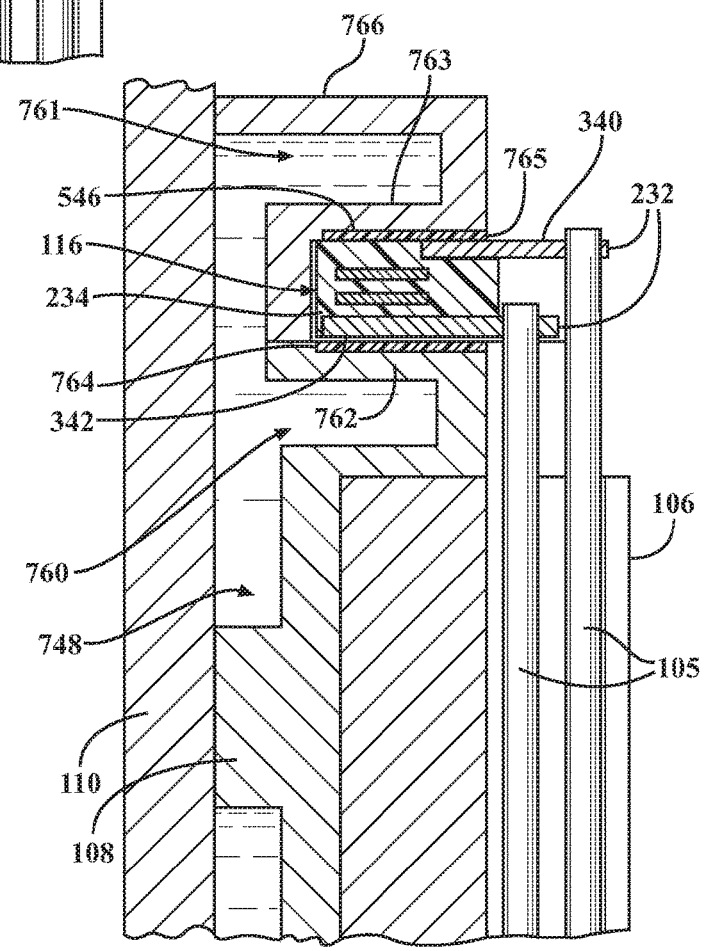
FIG. 7 is a side cross-section view showing the upper end turn assembly and a cooling structure according to an alternative implementation.

FIG. 7 is a side cross-section view showing the upper end turn ring 116 and a cooling structure according to an alternative implementation. The cooling structure is defined by the motor housing 108, an upper housing part 766, and the frame 110. As described with respect to the implementation shown in FIG. 6, the liquid 648 is disposed within the area between the motor housing 108 and the frame 110. In addition, the liquid 648 is disposed in the area between the upper housing part 766 and the frame 110.

The cooling structure of FIG. 7 includes a first liquid channel 760 and a second liquid channel 761. The first liquid channel 760 has a portion of the liquid 768 disposed in it and is defined by the motor housing 108 including a first wall 762 that is disposed between the first liquid channel 760 and the lower ring surface 547 of the upper end turn ring 116. The second liquid channel 761 has part of the liquid 648 disposed in it and is defined by the upper housing part 766, including a second wall 763. The second wall 763 is in contact with the liquid 648 and is in a thermally conductive relationship with the upper ring surface 546 of the upper end turn ring 116. The first wall 762 is located adjacent to the lower ring surface 547 of the upper end turn ring 116 and is in a thermally conductive relationship with the lower ring surface 547 of the upper end turn ring 116. The first wall 762 may be in direct contact with the lower ring surface 547 or may contact the lower ring surface 547 in a thermally conductive manner through a first insulating material 764 that electrically insulates the upper end turn ring 116 from the motor housing 108. The second wall 763 is located adjacent to the upper ring surface 546 of the upper end turn ring 116, such that it is in a thermally-conductive relationship with the upper end turn ring 116. The second wall 763 may be in direct contact with the upper ring surface 546 of the upper end turn ring 116 or may be in a thermally-conductive relationship through an intermediate structure such as a second insulating material 765 that is positioned between the upper housing part 766 and the upper end turn ring 116 in order to electrically insulate the upper housing part 766 from the upper end turn ring 116.

Figure 8:
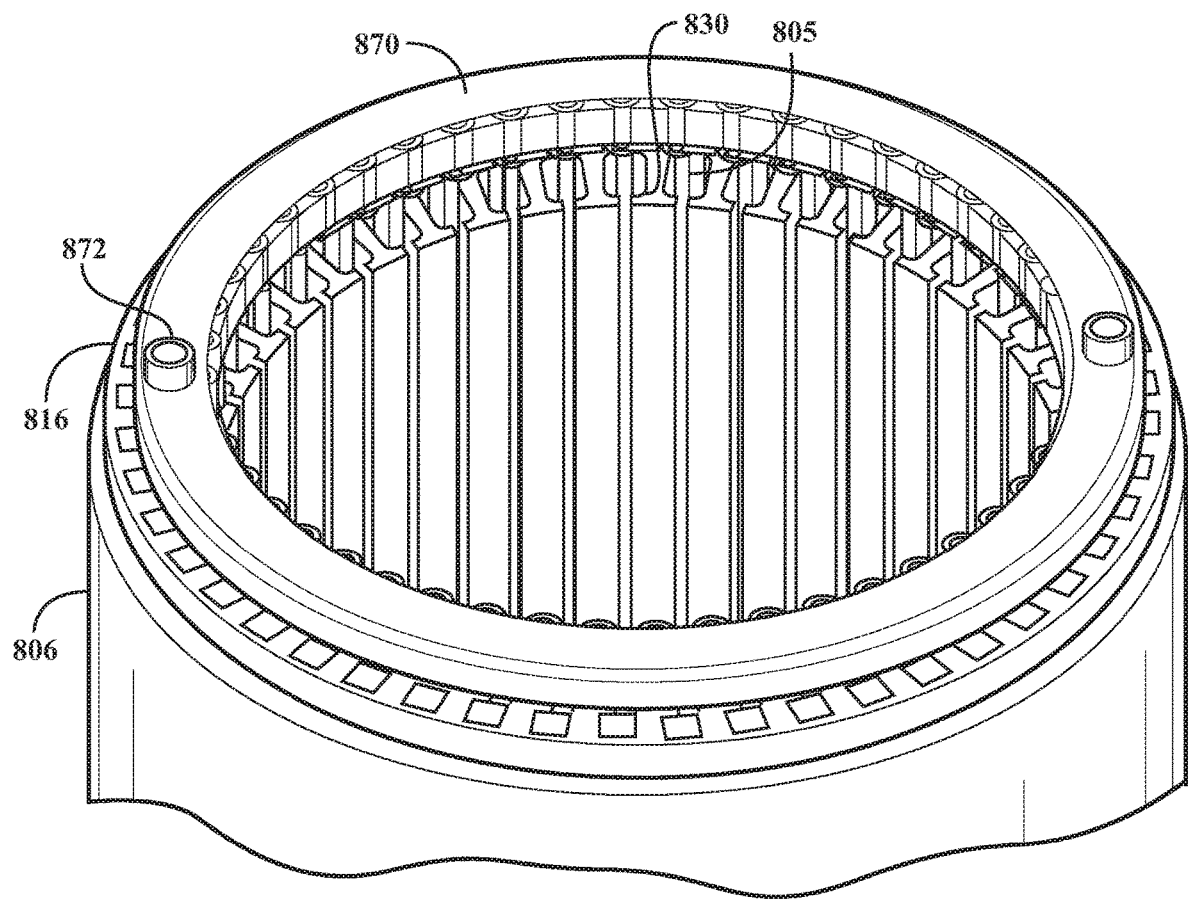
FIG. 8 is a perspective view showing an annular cooling manifold.

FIG. 8 is a perspective view that shows an annular cooling manifold 870. The annular cooling manifold 870 is operable to cool an end turn ring 816 and winding bars 805 that are disposed within slots 830 of a stator 806. The annular cooling manifold 870 includes one or more ports 872 that function as inlets and/or outlets for supplying liquid to or removing liquid from a hollow interior of the annular cooling manifold 870. By circulating liquid through the annular cooling manifold 870, heat may be removed from the end turn ring 816.

Figure 9:
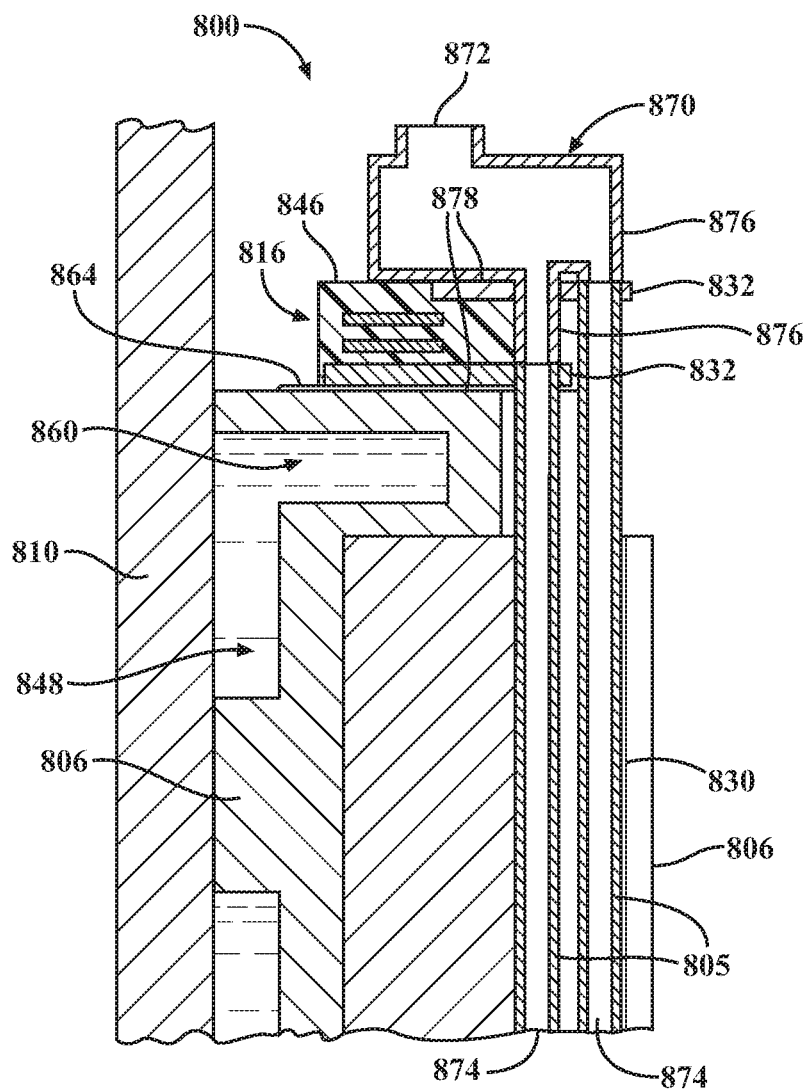
FIG. 9 is a cross-section view showing the annular cooling manifold of FIG. 8.

FIG. 9 is a cross-section view that shows the annular cooling manifold 870 disposed in a portion of an electric motor 800 that includes a motor housing 808 and a frame 810 that together define a cooling structure for circulating a liquid 848 within a space between the motor housing 808 and the frame 810 including a channel 860. The liquid 848 is also introduced into the ports 872 of the annular cooling manifold 870. The end turn ring 816 is in a thermally conductive relationship with the annular cooling manifold 870 and the motor housing 808. The motor housing 808 may contact the end turn ring 816 directly or through an insulating material 864 that electrically insulates the motor housing 808 from the end turn ring 816.

The end turn ring 816 includes bus bars 832 that are similar to the bus bars 232 as previously described. Each of the bus bars 832 is connected to a pair of the winding bars 805. The winding bars 805 are hollow structures that each include an internal passageway 874. In order to cool the winding bars, the annular cooling manifold 870 supplies the liquid 848 to the internal passageway 874 of each of the winding bars 805 through liquid supply ports 876 that are formed on the annular cooling manifold 870. The arrangement and lengths of the liquid supply ports 876 are configured such that the liquid supply ports 876 engage the bus bars 832. In particular, the winding bars 805 may be connected to the bus bars 832 such that the internal passageways 874 of the winding bars 805 are exposed to an upward-facing surface 878 of each of the bus bars 832. This configuration allows the liquid supply ports 876 to be each sealed to one of the upward-facing surfaces 878 of the bus bars 832, such that liquid may be transferred from the interior of the annular cooling manifold 870 into the internal passageways 874 of the winding bars 805.

To further absorb heat from the upper end turn ring 116, the annular cooling manifold 870 may be in contact with an annular upper surface 846 of the end turn ring 816.

One implementation is an electric motor that includes a stator, winding bars, an end turn assembly, and a cooling structure. The stator body defines slots, and the winding bars are each disposed in one of the slots defined by the stator body. An end turn assembly has an upper surface and a lower surface and is connected to the winding bars. A cooling structure has a first portion that is in a thermally conductive relationship with the lower surface of the end turn assembly and a second portion that is in a thermally conductive relationship with the upper surface of the end turn assembly.

In this implementation, the electric motor may be configured such that the first portion of the cooling structure defines a first liquid channel having a liquid therein and the second portion of the cooling structure defines a second liquid channel having the liquid therein. In this implementation, the electric motor may be configured such that the first portion of the cooling structure includes a first wall and the second portion of the cooling structure includes a second wall, an exterior surface of the first wall is configured to absorb heat from the lower surface of the end turn assembly, an interior surface of the first wall is in contact with the liquid, an exterior surface of the second wall is configured to absorb heat from the upper surface of the end turn assembly, and an interior surface of the second wall is in contact with the liquid.

In this implementation, the end turn assembly of the electric motor may include bus bars that are arranged in a circular array. In addition, each of the bus bars may include a first end portion that is connected to one of the winding bars and has a lower bar surface that defines part of the lower surface of the end turn assembly, and a second end portion that is connected to one of the winding bars and has an upper bar surface that defines part of the lower surface of the end turn assembly.

Another implementation is an electric motor that includes a stator body, winding bars, an end turn ring, and an annular cooling manifold. The stator body that defines slots, the winding bars that are each disposed in one of the slots defined by the stator body, and each winding bar of the winding bars defines an internal passageway. The end turn ring has an upper ring surface and a lower ring surface, and includes bus bars that are arranged in a circular array. Each of the bus bars has a first end portion that is connected to one of the winding bars, and the first end portion having a first upward-facing surface. Each of the bus bars also has a second end portion that is connected to one of the winding bars, and the second end portion has a second upward-facing surface. The annular cooling manifold that supplies a liquid to the internal passageway of each of the winding bars through liquid ports, wherein the liquid ports are each sealed to one of the first upward facing surfaces of the bus bars or one of the second upward facing surfaces of the bus bars. In this implementation, the electric motor may be configured such that the annular cooling manifold is in contact with the upper ring surface of the end turn ring.

Figure 10:
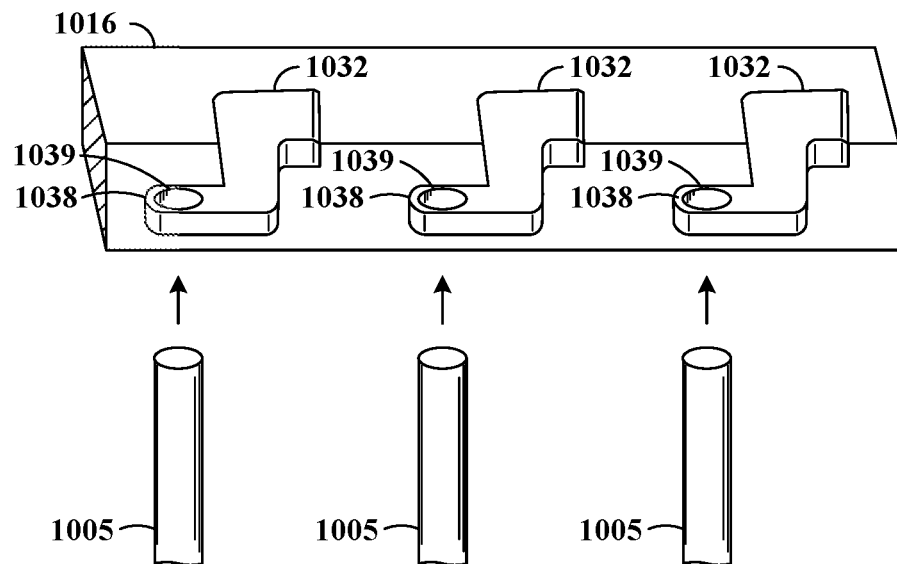
FIG. 10 is an illustration showing assembly of an upper end turn assembly to winding bars, with the upper end turn assembly and the winding bars in a disconnected position.
Figure 11:
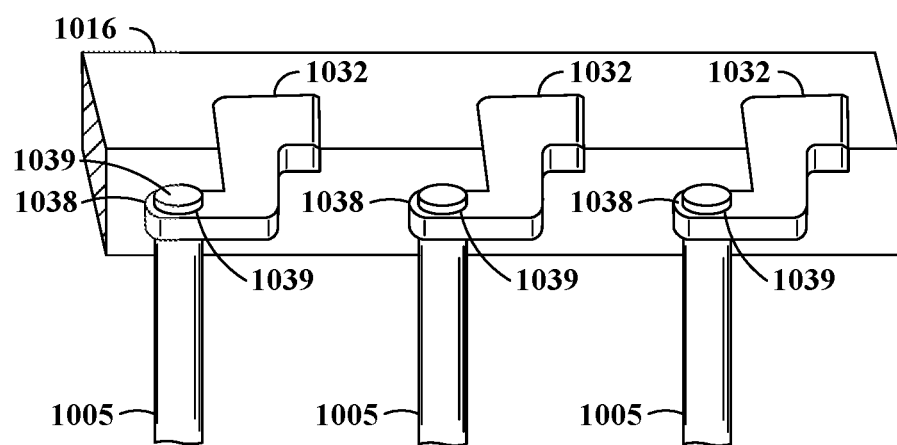
FIG. 11 is an illustration showing assembly of the upper end turn assembly to the winding bars of FIG. 10, with the upper end turn assembly and the winding bars in a connected position.

FIG. 10 is an illustration showing assembly of an upper end turn assembly, inclusive of an upper end turn ring 1016 and bus bars 1032, to winding bars 1005, with the upper end turn assembly and the winding bars 1005 in a disconnected position. FIG. 11 is an illustration showing assembly of the upper end turn assembly to the winding bars 1005 of FIG. 10, with the upper end turn assembly and the winding bars 1005 in a connected position. The bus bars 1032 have end portions 1038 that extend radially inward from the upper end turn ring 1016. Apertures 1039 are formed through the bus bars 1032, are positioned on the end portions 1038, and extend between the top and bottom surfaces of the bus bars 1032 in a generally axial direction relative to the end turn assembly. The apertures 1039 are configured such that they are complementary to end portions of the winding bars 1005 to allow connection of the winding bars 1005 to the bus bars 1032 by insertion.

Initially, as seen in FIG. 10, the winding bars 1005 are spaced from the bus bars 1032 to define the disconnected position, with the end portions of the winding bars 1005 aligned with the apertures 1039. In one implementation, the winding bars 1005 are inserted into the apertures 1039 and held by a friction fit. In another implementation, the winding bars 1005 are moved to the connected position by a press fit, through application of force to the upper end turn ring 1016 while the winding bars 1005 are held stationary (or vice versa), with the amount of force applied causing localized deformation of the winding bars 1005 and/or the bus bars 1032 sufficient to rigidly connect the winding bars 1005 to the bus bars 1032. For example, the winding bars 1005 may be held stationary while positioned in the slots of the stator of an electric motor (not shown in FIGS. 10-11), such as the slots 130 of the stator 106 of the electric motor 100. In another implementation, the winding bars 1005 are moved to the connected position by heat shrink fitting, by first heating the end portions 1038 of the bus bars 1032 to enlarge the apertures 1039. The end portions of the winding bars 1005 are then inserted into the apertures 1039. Cooling contracts the apertures 1039 to rigidly connect the bus bars 1032 to the winding bars 1005.

Figure 12:
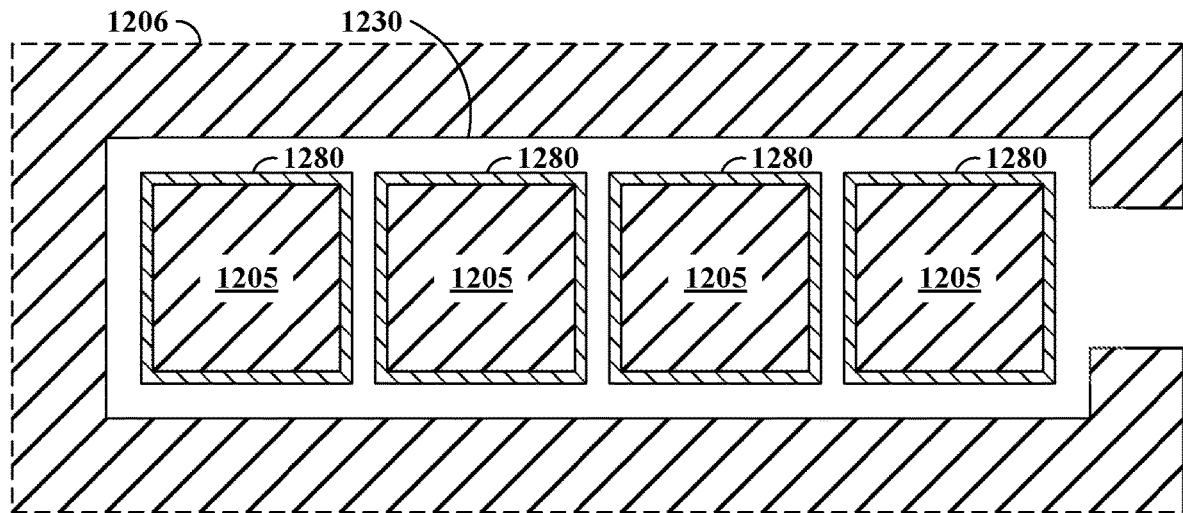
FIG. 12 is an illustration showing winding bars located in a slot of a stator according to an example.

FIG. 12 is an illustration showing windings bars 1205 located in a slot 1230 of a stator 1206 according to an example. Two or more of the winding bars 1205 are located in the slot 1230, and other slots of the stator 1206 may also include two or more winding bars. In the illustrated example, four of the winding bars 1205 are located in the slot 1230. Each of the winding bars 1205 is shown spaced from the internal walls of the slot 1230, but, in some implementations, some or all of the winding bars 1205 may contact the internal walls of the slot 1230.

Each of the winding bars 1205 has an insulation material 1280 that extends around it, and along its axial length. The insulation material 1280 is any suitable electrical insulator, such as fiberglass insulation or polyamide (e.g., nylon) insulation. The insulation material 1280 may be formed as one or more layers of a sheet material that are wrapped around or otherwise placed on each of the winding bars prior to insertion of the winding bars 1205 into the slot 1230. The insulation material 1280 is applied to the winding bars 1205 individually, such as by wrapping the insulation material 1280 to the winding bars 1205.

As one example, the insulation material 1280 may be applied to the winding bars 1205 first, then the winding bars 1205 are placed in the slot 1230, then the upper and lower end turn assemblies (not shown in FIG. 12) are connected to the winding bars 1205. As another example, the insulation material 1280 may be applied to the winding bars 1205 first, then the winding bars 1205 are connected to either of the upper end turn assembly or the lower end turn assembly, then placed in the slot 1230, then connected to the other of the upper end turn assembly or the lower end turn assembly.

In conventional electric motor designs, slot paper is stuffed into stator slots to create an interference fit that holds winding bars in place relative to a stator, and the slot paper is impregnated with an adhesive, such as epoxy resin, in order to fix the stator bars in place. In contrast, the insulation material 1280 may be wrapped or otherwise applied in layers, without creating an interference fit or fixing the winding bars 1205 with adhesives, because the end turn assemblies (e.g., as explained with reference to the electric motor 100) maintain the winding bars 1205 in position. Thus, the winding bars 1205 may be fixed against motion with respect to the stator 1206 by the end turn assemblies, and the winding bars 1205 may therefore be free from adhesive bonding to the stator 1206.

Figure 13:
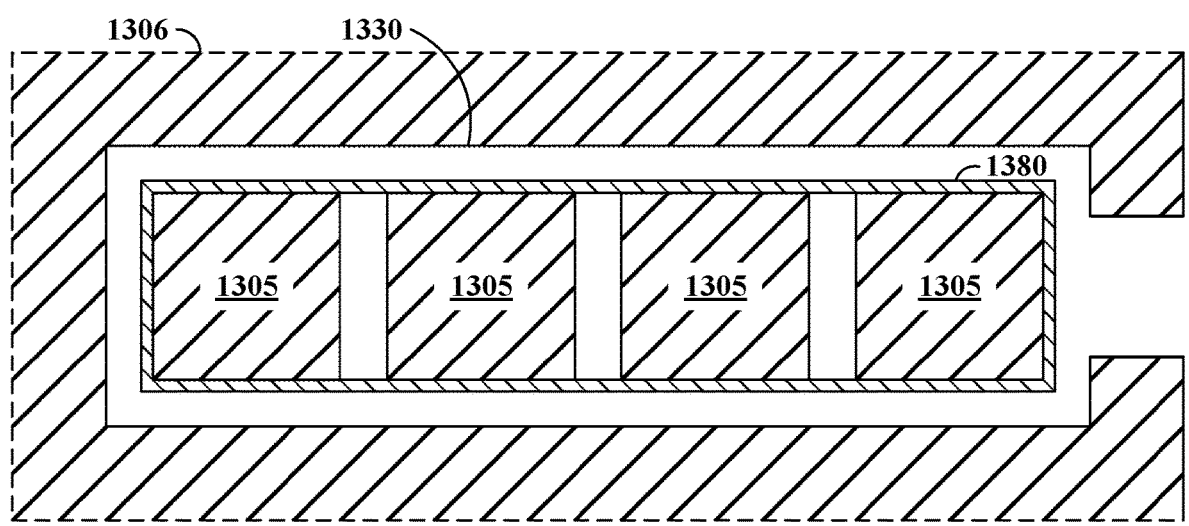
FIG. 13 is an illustration showing winding bars located in a slot of a stator according to an example.

FIG. 13 is an illustration showing windings bars 1305 located in a slot 1330 of a stator 1306 according to an example. The example shown in FIG. 13 is similar to the example shown in FIG. 12, except that an insulation material 1380 is applied around all of the winding bars 1305 together, as opposed to being wrapped or otherwise applied to the winding bars 1305 individually. As an example, the insulation material 1380 may be applied to a group of two or more of the winding bars 1305 that are disposed in the slot 1330 (i.e., in a common slot) of the stator 1306 such that one or more layers of the insulation material extend around all of the winding bars 1305 in the group. Assembly and use of the winding bars 1305 is otherwise as described with respect to the winding bars 1205.

Figure 14:
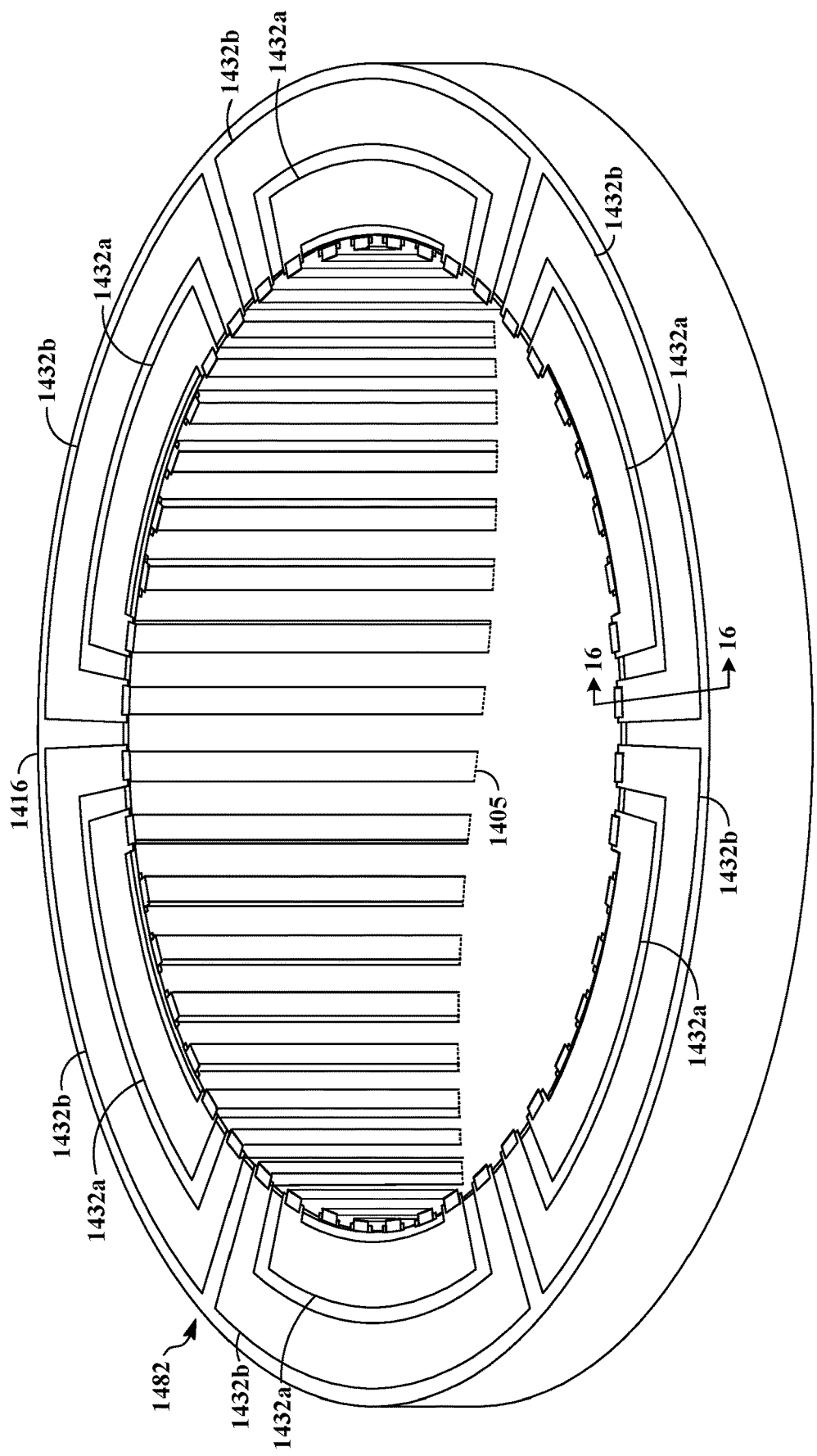
FIG. 14 is an illustration that shows an end turn assembly and winding bars that are connected to the end turn assembly according to an example.

FIG. 14 is an illustration that shows an end turn assembly 1482 and winding bars 1405 that are connected to the end turn assembly 1482. The end turn assembly 1482 and winding bars 1405 may be incorporated in, for example, an alternating current electric motor that energizes the winding bars 1405 using three-phase electrical power. The winding bars 1405 may be straight bars that are connected to the end turn assembly 1482 at their upper ends and to an analogous end turn assembly at their lower ends. Features and details from electric motors and related structures from previously-described examples may be utilized with the end turn assembly 1482 and the winding bars 1405, such as integration of these components into an electric motor, generally, and additional features such as cooling, insulation, and assembly features.

The end turn assembly 1482 includes an end turn ring 1416 (which may be an upper or lower end turn ring), inner bus bars 1432*a* that are embedded in the end turn ring 1416, and outer bus bars 1432*b* that are embedded in the end turn ring 1416.

The end turn ring 1416 is formed from a non-electrically conductive material, such as plastic, that is formed over the inner bus bars 1432*a* and the outer bus bars 1432*b*, such as by molding. Surfaces of some of the inner bus bars 1432*a* and the outer bus bars 1432*b* may be exposed to the exterior of the end turn assembly 1482 to aid in heat dissipation, such as at upper and/or lower surfaces of the end turn ring 1416. For example, the end turn ring 1416 may be molded onto the inner bus bars 1432*a* and the outer bus bars 1432*b*, and excess material may be removed from the end turn ring 1416, such as by machining, to expose portions of the inner bus bars 1432*a* and the outer bus bars 1432*b*.

The inner bus bars 1432*a* and the outer bus bars 1432*b* are electrically conductive structures that electrically connect pairs of the winding bars 1405. Thus, a first end and a second end of each of the inner bus bars 1432*a* and the outer bus bars 1432*b* are connected to respective ones of the winding bars 1405. In the illustrated example, each of the inner bus bars 1432*a* is paired with a respective one of the outer bus bars 1432*b*. Wither respect to each pair, the inner bus bars 1432*a* are shorter than the outer bus bars 1432*b*, and the outer bus bars have a U-shaped or C-shaped configuration, such that the outer bus bars 1432*b* are positioned adjacent to and outward from three sides of the inner bus bars 1432*a*, including first and second circumferential sides, and an outer radial side of the inner bus bars 1432*a*

Figure 15:
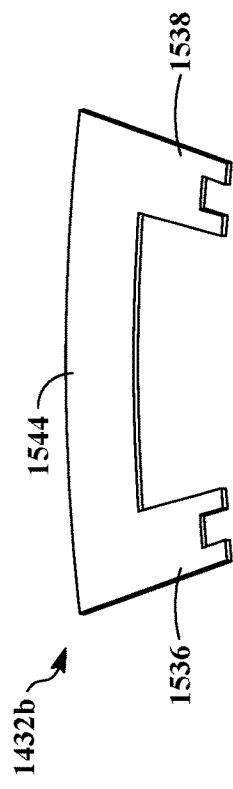
FIG. 15 is an illustration that shows an outer bus bar of the end turn assembly of FIG. 14.

The inner bus bars 1432*a* and the outer bus bars 1432*b* are substantially planar structures that are arranged in layers. As will be explained further herein, all bus bars in a particular layer may be at substantially the same elevation relative to a fixed reference point, such as a top or bottom surface of the end turn ring 1416. As best seen in FIG. 15, which is an illustration that shows one of the outer bus bars 1432*b*, the planar structure of the outer bus bars is defined by a sheet of material having a substantially consistent thickness between top and bottom surfaces. For example, the outer bus bars 1432*b* may be formed by stamping. The outer bus bars 1432*b* each have a first end portion 1536, a second end portion 1538, and an intermediate portion 1544. The first end portion 1536 and the second end portion 1538 each extend radially inward from the concave shape of the intermediate portion 1544. The intermediate portion 1544 is arc-shaped and configured to extend circumferentially around the end turn ring 1416. The first end portion 1536 and the second end portion 1538 may incorporate notches or apertures to allow connection to the winding bars 1405, such as by welding, by press fit, by heat shrink fit, or by other suitable methods.

To simplify assembly, the inner bus bars 1432*a* and the outer bus bars 1432*b* may be generally flat. Thus, each of the inner bus bars 1432*a* and the outer bus bars 1432*b* could be disposed at a generally consistent elevation. As one example, the top and bottom surface elevations at the first end portion 1536 and the second end portion 1538 may be substantially the same. As another example, the top and bottom surface elevations of the inner bus bars 1432*a* and the outer bus bars 1432*b* may be substantially the same throughout. As another example, the inner bus bars 1432*a* and the outer bus bars 1432*b* may be substantially planar and free from bends in the axial direction of the end turn assembly 1482.

The inner bus bars 1432*a* are configured similarly to the outer bus bars 1432*b*, differing in geometry due to their position radially inward from and circumferentially within the extents of the outer bus bars 1432*b*.

Figure 16:
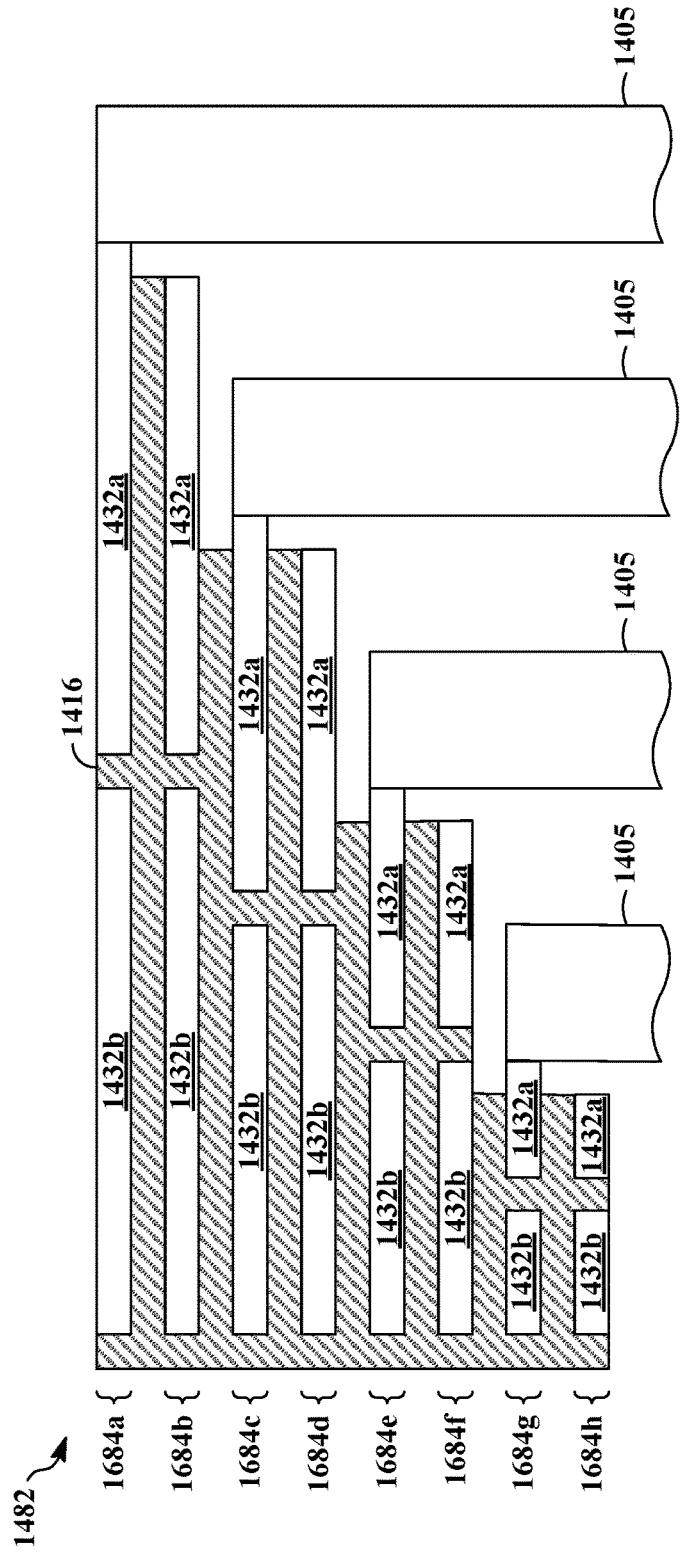
FIG. 16 is a cross-section view of the end turn assembly of FIG. 14 taken along line 16-16 of FIG. 14.

In FIG. 14, the inner bus bars 1432*a* and the outer bus bars 1432*b* that are depicted are from a top most layer of multiple layers of bus bars that are incorporated in the end turn assembly 1482. FIG. 16 is a cross-section view of the end turn assembly of FIG. 14 taken along line 16-16 of FIG. 14. As shown in FIG. 16, there are four of the winding bars 1405 arranged radially, for disposition in a single slot of a stator (not shown in FIG. 16). To provide electrical power to the winding bars 1405 that are depicted in FIG. 16, as well as the winding bars 1405 that are disposed at other locations around the end turn assembly 1482, the inner bus bars 1432*a* and the outer bus bars 1432*b* are provided in multiple layers.

In the illustrated example, the layers of the inner bus bars 1432*a* and the outer bus bars 1432*b* include, in top-to-bottom order, a first layer 1684*a*, a second layer 1684*b*, a third layer 1684*c*, a fourth layer 1684*d*, a fifth layer 1684*e*, a sixth layer 1684*f*, a seventh layer 1684*g*, and an eighth layer 1684*h*. Thus, given the substantially flat configuration for the inner bus bars 1432*a* and the outer bus bars 1432*b*, the end turn assembly 1482 includes multiple stacked layers of bus bars embedded in the non-electrically conductive material of the end turn ring 1416, wherein each layer is substantially flat per the geometry of the bus bars included in the layer. The bus bars from the first layer 1684*a* and the second layer 1684*b* supply electrical power to radially innermost ones of the winding bars 1405 and successive pairs of layers of the bus bars supply electrical power to the successively radially outward ones of the winding bars 1405.

What is claimed is:

1. An electric motor, comprising:
    a stator body that defines slots;
    winding bars that are each disposed in one of the slots defined by the stator body;
    an end turn ring that has an upper exterior ring surface and a lower exterior ring surface, and includes bus bars that are arranged in a circular array, wherein each bus bar has a first end portion that is connected to one of the winding bars, the first end portion having a lower bar surface that defines part of the lower exterior ring surface, and wherein each bus bar has a second end portion that is connected to one of the winding bars, the second end portion having an upper bar surface that defines part of the upper exterior ring surface; and
    a cooling structure disposed in a thermally conductive relationship with at least one of the upper exterior ring surface or the lower exterior ring surface for receiving heat from the end turn ring.

2. The electric motor of claim 1, wherein the cooling structure includes a liquid channel having a liquid disposed therein.

3. The electric motor of claim 2, wherein the liquid channel is circular.

4. The electric motor of claim 3, wherein the end turn ring is centered radially on an axis and the liquid channel is centered radially on the axis.

5. The electric motor of claim 2, wherein the cooling structure includes a wall that is configured to absorb heat from the end turn ring, wherein an interior surface of the wall is in contact with the liquid.

6. The electric motor of claim 5, wherein an exterior surface of the wall of the cooling structure is in contact with the lower exterior ring surface of the end turn ring.

7. The electric motor of claim 5, wherein an exterior surface of the wall of the cooling structure is in contact with the upper exterior ring surface of the end turn ring.

8. The electric motor of claim 1, wherein the cooling structure includes a first liquid channel having a liquid disposed therein and a second liquid channel having the liquid disposed therein.

9. The electric motor of claim 8, wherein the first liquid channel is located below the lower exterior ring surface of the end turn ring and the second liquid channel is located above the upper exterior ring surface of the end turn ring.

10. The electric motor of claim 9, wherein:
    the end turn ring is centered radially on an axis,
    the first liquid channel is circular and is centered radially on the axis, and
    the second liquid channel is circular and is centered radially on the axis.

11. The electric motor of claim 8, wherein the cooling structure includes a first wall and a second wall, an exterior surface of the first wall is in a thermally conductive relationship with the lower exterior ring surface of the end turn ring, an interior surface of the first wall is in contact with the liquid, an exterior surface of the second wall is in a thermally conductive relationship with the upper exterior ring surface of the end turn ring, and an interior surface of the second wall is in contact with the liquid.

12. A three-phase electric motor, comprising:
a stator body that defines slots;
an upper end turn assembly and a lower end turn assembly, wherein each of the upper end turn assembly and the lower end turn assembly have an end turn ring that has an upper ring surface and a lower ring surface and includes bus bars that are arranged in a circular array;
a cooling structure disposed in a thermally conductive relationship with at least one of the upper ring surface or the lower ring surface for receiving heat from the end turn ring; and
winding bars that are each disposed in one of the slots defined by the stator body, wherein the winding bars are straight and each extend from one of the bus bars of the upper end turn assembly to one of the bus bars of the lower end turn assembly,
wherein each bus bar of the upper end turn assembly and the lower end turn assembly has a first end portion that is connected to one of the winding bars, the first end portion having a lower bar surface that defines part of the lower ring surface of the upper end turn assembly or the lower end turn assembly,
wherein each bus bar of the upper end turn assembly and the lower end turn assembly has a second end portion that is connected to one of the winding bars, the second end portion having an upper bar surface that defines part of the upper ring surface of the upper end turn assembly or the lower end turn assembly, and
wherein the bus bars of the upper end turn assembly and the lower end turn assembly include inner bus bars and outer bus bars arranged in pairs with the outer bus bar of each pair located radially and circumferentially outward from the respective inner bus bar of each pair and with the inner bus bar and the outer bus bar of each pair located at a substantially common axial elevation.

13. The three-phase electric motor of claim 12, wherein the winding bars are connected to the bus bars of the upper end turn assembly and the lower end turn assembly by a friction fit.

14. The three-phase electric motor of claim 12, wherein the winding bars are connected to the bus bars of the upper end turn assembly and the lower end turn assembly by a press fit.

15. The three-phase electric motor of claim 12, wherein the winding bars are connected to the bus bars of the upper end turn assembly and the lower end turn assembly by a heat shrink fit.

16. The three-phase electric motor of claim 12, wherein the upper end turn assembly and the lower end turn assembly each include an end turn ring that is formed from a non-electrically conductive material, and the bus bars are embedded in the end turn ring.

17. The three-phase electric motor of claim 12, wherein the winding bars are each individually wrapped in an insulation material.

18. The three-phase electric motor of claim 12, wherein a group of two or more of the winding bars are wrapped together in an insulation material.

19. The three-phase electric motor of claim 12, wherein the winding bars are fixed against motion with respect to the stator body by the upper end turn assembly and the lower end turn assembly, and the winding bars are free from adhesive bonding to the stator body.

20. The three-phase electric motor of claim 12, wherein the bus bars are planar and are free from bends in an axial direction.

21. The three-phase electric motor of claim 20, wherein the bus bars each have a first end portion and a second end portion that are connected to respective ones of the winding bars at a common elevation.

22. The three-phase electric motor of claim 20, wherein the bus bars are arranged in layers.

23. An electric motor, comprising:
a stator body that defines slots;
winding bars that are each disposed in one of the slots defined by the stator body;
an end turn ring that has an upper ring surface and a lower ring surface, and includes bus bars that are arranged in a circular array, each bus bar having:
a first end portion that is connected to one of the winding bars, the first end portion having a lower bar surface that defines part of the lower ring surface, and
a second end portion that is connected to one of the winding bars, the second end portion having an upper bar surface that defines part of the upper ring surface;
a cooling structure disposed in a thermally conductive relationship with at least one of the upper ring surface or the lower ring surface for receiving heat from the end turn ring, wherein the cooling structure includes a liquid channel having a liquid disposed therein and the cooling structure includes a wall that is configured to absorb heat from the end turn ring, wherein an interior surface of the wall is in contact with the liquid; and
an electrical insulation layer disposed between the end turn ring and the cooling structure, wherein an exterior surface of the wall of the cooling structure is in contact with the electrical insulation layer and the lower ring surface of the end turn ring.

24. An electric motor, comprising:
a stator body that defines slots;
winding bars that are each disposed in one of the slots defined by the stator body;
an end turn ring that has an upper ring surface and a lower ring surface, and includes bus bars that are arranged in a circular array, each bus bar having:
a first end portion that is connected to one of the winding bars, the first end portion having a lower bar surface that defines part of the lower ring surface, and
a second end portion that is connected to one of the winding bars, the second end portion having an upper bar surface that defines part of the upper ring surface;
a cooling structure disposed in a thermally conductive relationship with at least one of the upper ring surface or the lower ring surface for receiving heat from the end turn ring, wherein the cooling structure includes a liquid channel having a liquid disposed therein and the cooling structure includes a wall that is configured to absorb heat from the end turn ring, wherein an interior surface of the wall is in contact with the liquid; and
an electrical insulation layer disposed between the end turn ring and the cooling structure, wherein an exterior surface of the wall of the cooling structure is in contact with the electrical insulation layer and the upper ring surface of the end turn ring.

* * * * *